United States Patent [19]
Fraker et al.

[11] Patent Number: 5,919,239
[45] Date of Patent: Jul. 6, 1999

[54] POSITION AND TIME-AT-POSITION LOGGING SYSTEM

[76] Inventors: William F. Fraker, 859 Bennett Ct., Carmel, Ind. 46032; John M. Storm, 479 Cartersburg Rd., Danville, Ind. 46122

[21] Appl. No.: 08/671,683

[22] Filed: Jun. 28, 1996

[51] Int. Cl.[6] ................................................... G06F 17/00
[52] U.S. Cl. ........................... 701/35; 701/213; 701/215; 340/573
[58] Field of Search .............................. 701/35, 213, 215, 701/33; 342/357, 457; 340/988, 991, 573; 455/456, 457

[56] References Cited

U.S. PATENT DOCUMENTS

| | | | |
|---|---|---|---|
| 4,258,421 | 3/1981 | Juhasz et al. | 364/424 |
| 5,014,206 | 5/1991 | Scribner et al. | 364/449 |
| 5,148,179 | 9/1992 | Allison | 342/357 |
| 5,262,774 | 11/1993 | Kuwahara et al. | 340/988 |
| 5,311,197 | 5/1994 | Sorden et al. | 342/457 |
| 5,327,347 | 7/1994 | Hagenbuch | 364/424.07 |
| 5,359,528 | 10/1994 | Haendel et al. | 364/424.04 |
| 5,379,224 | 1/1995 | Brown et al. | 364/449 |
| 5,398,190 | 3/1995 | Wortham | 364/460 |
| 5,422,814 | 6/1995 | Sprague et al. | 364/449 |
| 5,422,816 | 6/1995 | Sprague et al. | 364/449 |
| 5,434,787 | 7/1995 | Okamoto et al. | 364/449 |
| 5,450,344 | 9/1995 | Woo et al. | 364/449 |
| 5,475,597 | 12/1995 | Buck | 364/443 |
| 5,479,351 | 12/1995 | Woo et al. | 364/449 |
| 5,488,558 | 1/1996 | Ohki | 364/449 |
| 5,490,079 | 2/1996 | Sharpe et al. | 364/467 |
| 5,498,898 | 3/1996 | Shigekusa et al. | 340/988 |
| 5,652,570 | 7/1997 | Lepkofker | 340/573 |
| 5,767,804 | 6/1998 | Murphy | 342/357 |
| 5,772,534 | 6/1998 | Dudley | 473/407 |

OTHER PUBLICATIONS

Article in *Overton's Discount Boating Accessories Magazine*, '96—#1, "Magellan Meridian XL", p. 13.

*Primary Examiner*—Michael Zanelli
*Attorney, Agent, or Firm*—Woodard, Emhardt, Naughton Moriarty & McNett

[57] ABSTRACT

One embodiment of a position and time-at-position logging apparatus includes a GPS receiver, a microprocessor, memory, a keypad and a data port. The apparatus receives GPS signals and determines therefrom position and time-at-position information of the apparatus, and logs the information in memory in response to a key depression in a manual mode of operation, or in response to a data capture signal in an automatic mode of operation. The data port may be connected to an input device for generating the data capture signal, an output device for data reporting, or to a computer operable to program an operational mode of the apparatus or download a number of sets of information for processing by report generating software resident therein. The apparatus may optionally include a radio transceiver for exchanging data and/or programming information with a remote source, and may further include a vehicle data port for receiving operational data in accordance with various vehicle/engine operating parameters.

42 Claims, 12 Drawing Sheets

POSITION AND TIME-AT-POSITION LOGGING SYSTEM

FIELD OF THE INVENTION

The present invention relates generally to apparatuses for logging position and time-at-position data relating to an entity, and more specifically to an apparatus for logging such data in accordance with time and position data broadcast by a number of earth orbiting satellites.

BACKGROUND OF THE INVENTION

Satellite-based radio navigation systems are known and are capable of broadcasting continuous position, velocity, and time information to an unlimited number of users. One such system is currently in place in the United States and is known as the NAVSTAR (NAVigation Satellite Timing And Ranging) Global Positioning System (GPS). GPS is an absolute positioning system capable of providing accurate three-dimensional position and time-at-position information. Presently, the GPS includes 24 satellites uniformly disbursed about six orbital planes of four satellites each. Each of the orbits are included at an angle of 55 degrees relative to the equator and are separated from each other by multiples of 60 degrees longitude. The orbits have an orbital radii of 26,560 kilometers (which translates to an altitude of approximately 11,000 nautical miles), and are approximately circular. The orbits are non-geo-synchronous, with 0.5 sidereal day (11.967 hours) orbital time intervals, so that the satellites move with time relative to the earth. Further, each satellite has an atomic clock synchronized system-wide to provide for highly accurate time clock information such as time-of-day and calendar date. This design ensures that signals from at least four GPS satellites can be received at any point on or above the earth's surface at any point in time. A discussion of GPS technology and applications thereof is given in Harris and Sikorski, *GPS Technology and Opportunities*, presented at Expo Comm. China '92, Bejing, China, Oct. 30–Nov. 4, 1992.

Another satellite navigation system, known as GLONASS (GLObal Orbiting NAvigation Satellite System), operates similarly to GPS and is currently in place over Russia. GLONASS also uses 24 satellites which are distributed approximately uniformly in three orbital planes of eight satellites each. Each orbital plane is inclined at 64.8 degrees relative to the equator, and each of the three orbital planes are offset from each other by multiples of 1200 longitude. The GLONASS orbits are smaller and shorter than their US counterparts, having radii of approximately 25,510 kilometers and periods of 8/17 of a sidereal day (11.26 hours) respectively.

The use of satellite navigation systems for determining the global position of an observer is known as exemplified by U.S. Pat. No. 5,434,787 to Okamoto et al. and U.S. Pat. No. 5,434,789 to Fraker et al. Further, it is known to utilize a satellite navigation system to determine the global position of an observer while using a separate time-keeping device to determine time-at-position information. Examples of such systems are given by U.S. Pat. No. 5,490,079 to Sharpe et al., U.S. Pat. No. 5,488,558 to Ohki, and U.S. Pat. No. 5,398,190 to Wortham. Further yet, it is known to utilize a satellite navigation system to determine both the global position and time-at-position of an observer, as exemplified by U.S. Pat. No. 5,479,351 to Woo et al., U.S. Pat. No. 5,311,197 to Sorden et al and U.S. Pat. No. 5,262,774 to Kuwahara et al.

While some of the foregoing systems are operable to provide position and time-at-position information of an observer, each of these systems suffers from undesirable drawbacks. For example, none of the foregoing systems are operable to log several instances such position and time-at-position information and provide such information to a data reporting arrangement. Further, none of the foregoing systems is programmable to operate in either a manual or automatic mode. Further yet, none of these systems may be programmed for operation from a remote location. Still further, none of these systems is operable to log such information in response to an automatic external event which may be programmed at any time from a remote location. What is therefore needed is a position and time-at-position logging apparatus and system incorporating, inter alia, some of the foregoing features lacking from known position and time-at-position determining apparatuses.

SUMMARY OF THE INVENTION

The present invention addresses at least the foregoing drawbacks described in the BACKGROUND section, and provides for a position and time-at-position logging apparatus and system having a number of additional features. In accordance with one aspect of the present invention, a time and position logging system includes a receiver for receiving radio signals transmitted from a plurality of earth orbiting satellites, a processor for processing the radio signals and determining therefrom a position of the system in global coordinates and associated time information corresponding to a time at which the system resides at the determined position, memory for storing a number of sets of global coordinates and associated time information, means responsive to a first signal for logging each set of global coordinates and associated time information in the memory, and a data collection arrangement for collecting a number of sets of global coordinates and associated time information from the memory and compiling the sets for display.

In accordance with another aspect of the present invention, a time and position logging device comprises a receiver for receiving radio signals transmitted from a plurality of earth orbiting satellites, a switch actuatable to produce a first data capture signal, means for receiving a second data capture signal provided by an external source, a memory unit, and a processor processing the radio signals and determining therefrom a position of the device in global coordinates and associated time information corresponding to a time at which the device resides at the determined position. The processor is programmable to operate in a first mode of operation to store the position and associated time information within the memory unit in response to the first data capture signal, and a second mode of operation to store the position and associated time information within the memory unit in response to the second data capture signal.

In accordance with yet another aspect of the present invention, a method of tracking position and time-at-position information of an entity comprises the steps of: receiving radio signals transmitted from a plurality of earth orbiting satellites adjacent to the entity, processing the radio signals and determining therefrom a position of the entity in global coordinates and associated time information corresponding to a time at which the entity resides at the determined position, storing the position and time information in response to a predefined event, and providing the position and time information to a data reporting arrangement in response to a data reporting request.

One object of the present invention is to provide a flexible position and time-at-position logging apparatus programmable to operate in either a manual or automatic mode to log position and time-at-position information in accordance with predefined events.

Another object of the present invention is to provide such an apparatus that is programmable in real time from a remote location.

Yet another object of the present invention is to provide such an apparatus which is compatible with a data reporting arrangement to provide several sets of position and time-at-position information thereto.

Still another object of the present invention is to provide such an apparatus configured to provide such information to a remote data reporting arrangement.

These and other objects of the present invention will become more apparent from the following description of the preferred embodiment.

DESCRIPTION OF THE PREFERRED EMBODIMENT

Figure 1A:
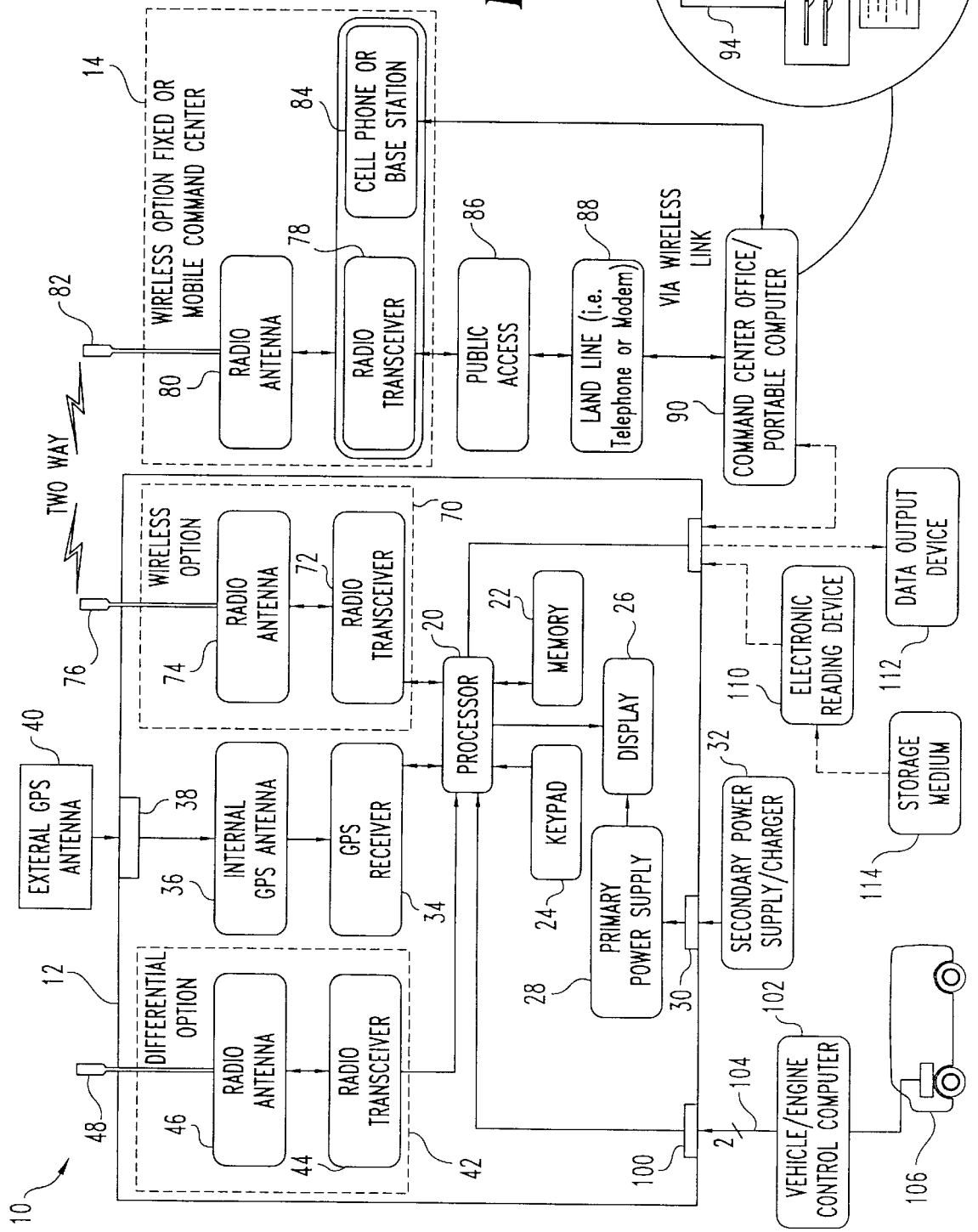
FIGS. 1A and 1B illustrate a block diagram representation of a position and time-at-position logging system according to the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

HARDWARE DESCRIPTION

Figure 1B:
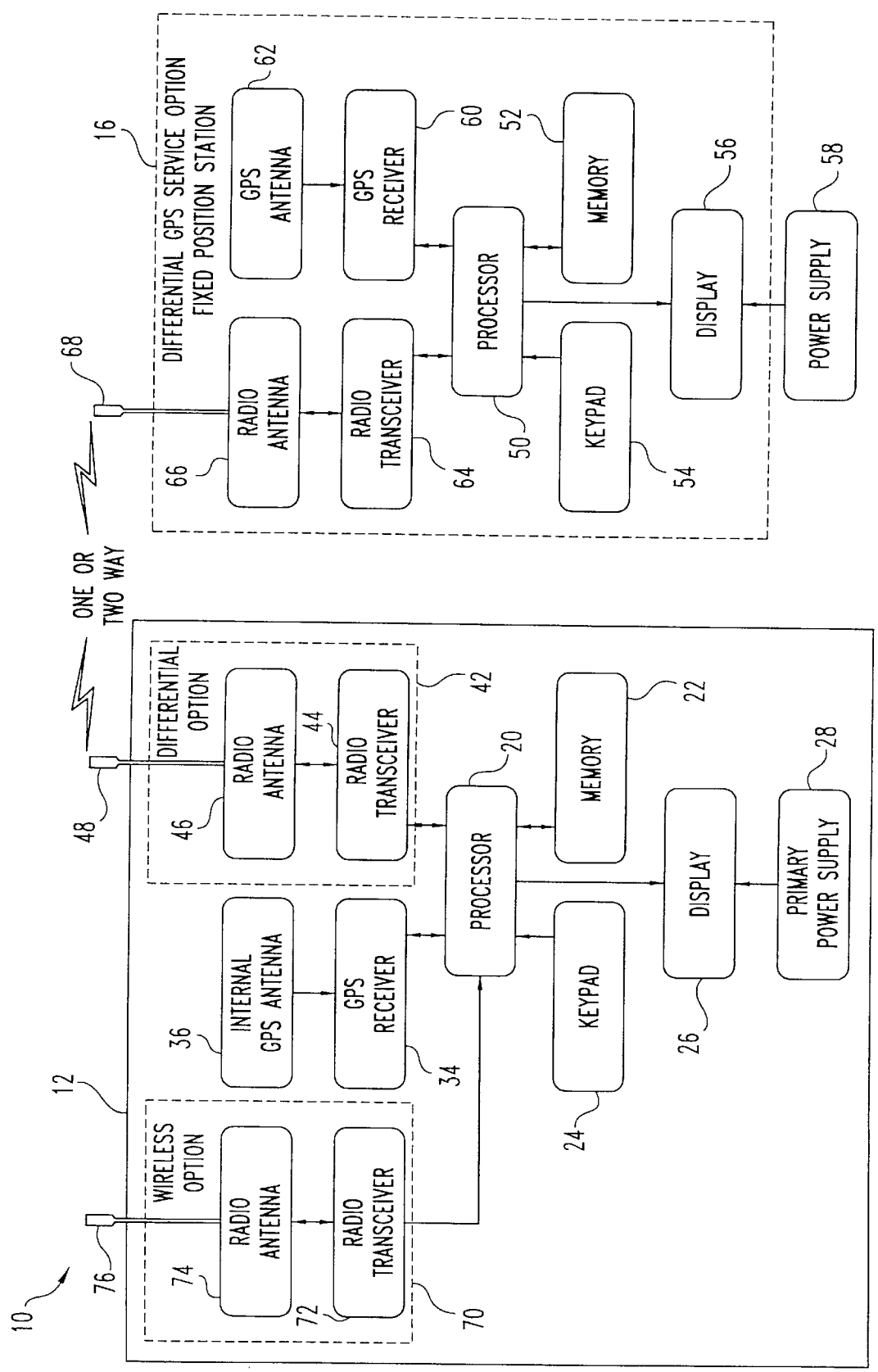

Referring now to FIGS. 1A and 1B, a position and time-at-position logging system 10, in accordance with the present invention, is shown. Central to system 10 is a position and time-at-position logging apparatus 12 (hereinafter, time/location logger, or TLL). As will be more fully described hereinafter, system 10 may optionally include a fixed or mobile command center 14 operable to communicate, via two-way wireless communication, with TLL 12, and may further optionally include a fixed position differential GPS station 16 operable to communicate, via either one or two way wireless communication, with TLL 12.

Referring specifically to FIG. 1A, TLL 12 includes, as its central component, a processor 20 which is preferably at least a 16-bit commercially available microprocessor or microcontroller. A memory unit 22 is connected to processor 20 for two-way information transfer therebetween, and preferably includes at least 512K of random access memory (RAM) and 256K of read only memory (ROM). Preferably, memory unit 22 is outfitted for memory capacity expansion via additional memory unit or units such as, for example, erasable programmable read only memory (EPROM) or electrically erasable programmable read only memory (EEPROM).

A keypad 24, preferably including a number of depressible keys, is connected to processor 20. Processor 20 is operable, as is known in the art, to receive and differentiate between signals generated by keypad 24, which signals correspond to operator depressions of the various keys thereon. Processor 20 is further connected to a display 26 which may be a coded or alphanumeric character display comprised of, for example, light emitting diode (LED) or vacuum fluorescent segments. Alternatively, display 26 may be a character and graphics display such as a liquid crystal, or similar display.

A primary power supply 28 is connected to display 26 and, in turn, to the other power consuming items within TLL 20 such as processor 20. Preferably, primary power supply 28 is a rechargeable battery having, in one embodiment, a nominal voltage of approximately 6.0 volts, and in an alternate embodiment, a nominal voltage of approximately 12.0 volts. Primary power supply is connected to an external connector 30 which is configured to receive connection from a secondary power supply or power supply charger 32. Secondary power supply/charger 32 may be a known unit operable to convert AC power to DC power in a range suitable for use by TLL 12, or may an interface configured for connection to an existing DC power source such as an automotive battery (not shown). In the latter case, power supply/charger 32 may be a connector configured for electrical connection to, for example, a cigarette lighter of an automobile or similar source of automotive battery power. In either case, the TLL 12 is preferably configured to be fully operable while simultaneously charging primary power supply 28.

Processor 20 is further connected to a receiver 34 for receiving radio signals broadcast by a number of earth orbiting satellites. Preferably, receiver 34 is a GPS receiver, although the present invention contemplates that receiver 34 may alternatively be a GLONASS receiver. In either case, receiver 34 is connected to an internal GPS (or GLONASS) antenna 36 which is, in turn, connected to an external connector 38. In the event that the TLL 12 does not have an unobstructed "view" of the sky, an external GPS (or GLONASS) antenna 40 is provided for connection to external connector 38. TLL 12 may therefore be operatively positioned in, for example, a vehicle and connected to an antenna 40 external to the vehicle for receiving GPS signals.

Optionally, TLL 12 may include a differential radio signal transceiver section 42 connected to processor 20. Radio signal transceiver section 42 includes a radio transceiver 44 connected to processor 20, a radio signal antenna section 46 connected to radio transceiver 44, and an antenna member 48, preferably telescoping or flexible, connected to antenna section 46 and extending from TLL 12. Referring specifically to FIG. 1B, wherein certain elements of, and external connections to, TLL 12 have been omitted for brevity and clarity, system 10 further includes differential fixed position GPS station 16 operable to conduct one or two way communications with TLL 12 via differential radio signal transceiver section 42. Like TLL 12, differential fixed position GPS station 16 preferably includes a processor 50 connected to a memory unit 52, keypad 54, display 56, GPS receiver 60 and radio transceiver 64. A power supply 58 provides electrical power to all power consuming items within station 16. A GPS antenna 62 is connected to GPS receiver 60 and is operable to receive radio signals transmitted or broadcast by earth orbiting satellites. A radio antenna unit 66 is connected to radio transceiver 64 and to an antenna member 68 which may be rigidly fixed, telescoping or flexible.

As will be more fully described hereinafter, each of the TLL 12 and station 16 are identically capable of determining absolute positioning of its corresponding GPS receiver in accordance with a predefined grid system such as, for example, latitude, longitude and altitude, as well as the time at which the GPS receiver resides at the determined position, preferably in terms of calendar date, hours, minutes, seconds and milliseconds. In accordance with known differential positioning techniques, two or more such receivers can be used to determine the relative position between the two receivers in real time. For example, station 16 receives GPS signals, determines a corresponding absolute position thereof, and transmits such information via radio transceiver 64 to radio transceiver 44 of TLL 12. Radio transceiver 44 provides the absolute position information relating to station 16 to processor 20 which then subtracts this information from corresponding absolute position information relating to TLL 12 to provide correctional data. Processor 20 thereafter uses such correctional data to adjust the absolute position data relating to TLL 12 to thereby more accurately reflect a true position of TLL 12. This technique is much more accurate than absolute position determinations provided that the measured distance is small compared to the distance between the receivers and the satellites. Whereas absolute position determinations may, with inexpensive GPS systems, provide for accuracy within tens of meters, the foregoing differential GPS techniques may be used to improve such position calculations to within approximately a few meters.

Referring specifically to FIG. 1A, the TLL 12 may further optionally include a second radio signal transceiver section 70 connected to processor 20. Radio signal transceiver section 70 includes a radio transceiver 72 connected to processor 20, a radio signal antenna section 74 connected to radio transceiver 72, and an antenna member 76, preferably telescoping or flexible, connected to antenna section 74 and extending from TLL 12. Fixed or mobile command center 14 also includes a radio transceiver 78 connected to radio antenna section 80 which is, in turn, connected to antenna member 82 extending from command center 14. Antenna member 82 may be rigid, telescoping or flexible. Radio transceiver 78 is preferably connected to a cellular telephone or base station 84 which is configured for wireless communication with fixed position command center 90. Radio transceiver 78 is further preferably connected to a public access medium 86 which is, in turn, configured for communication with a land line 88, such as a telephone or modem, connected via either a wired or wireless connection to command center 90. Command center includes a computer system, preferably a personal computer (PC) having a processor portion 92, a monitor operably connected thereto, a data entry/manipulation apparatus 96 such as a keyboard and/or mouse, and program/data storage and retrieval drives, such as magnetic disk and CD ROM drives. In operation, which will be more fully described hereinafter, the command center 90, more particularly the PC 92-98, is configured to transmit and receive data via fixed or mobile command center 14 to the TLL 12. Specifically, radio transceivers 72 and 78 are operable, as described with respect to radio transceivers 44 and 64, to communicate with each other and therefore provide for transfer of information between processor 20 of TLL 12 and PC 92-98 of command center 90.

Processor 20 is further connected to an external connector 100 which is preferably a vehicle data communication port adapted for connection to a vehicle/engine control computer 102 of a motor vehicle 106 via a data communications link 104. Vehicle/engine control computer 102 preferably monitors various vehicle and engine operating parameters and continuously broadcasts such information over the data communications link 104, which may be an ATA standards serial interface bus such as an SAE J1587 communications bus, or similar communications link used in motor vehicles.

Processor 20 is still further connected to external connector 108 which is preferably a data communications port. In one embodiment, connector 108 is configured for standard RS-232 connection, although the present invention contemplates other known configurations for connector 108. In any event, connector 108 is optionally connectable to an electronic reading device 110, a data output device 112, PC 92-98 of command center 90, and like peripheral units.

Figure 2:
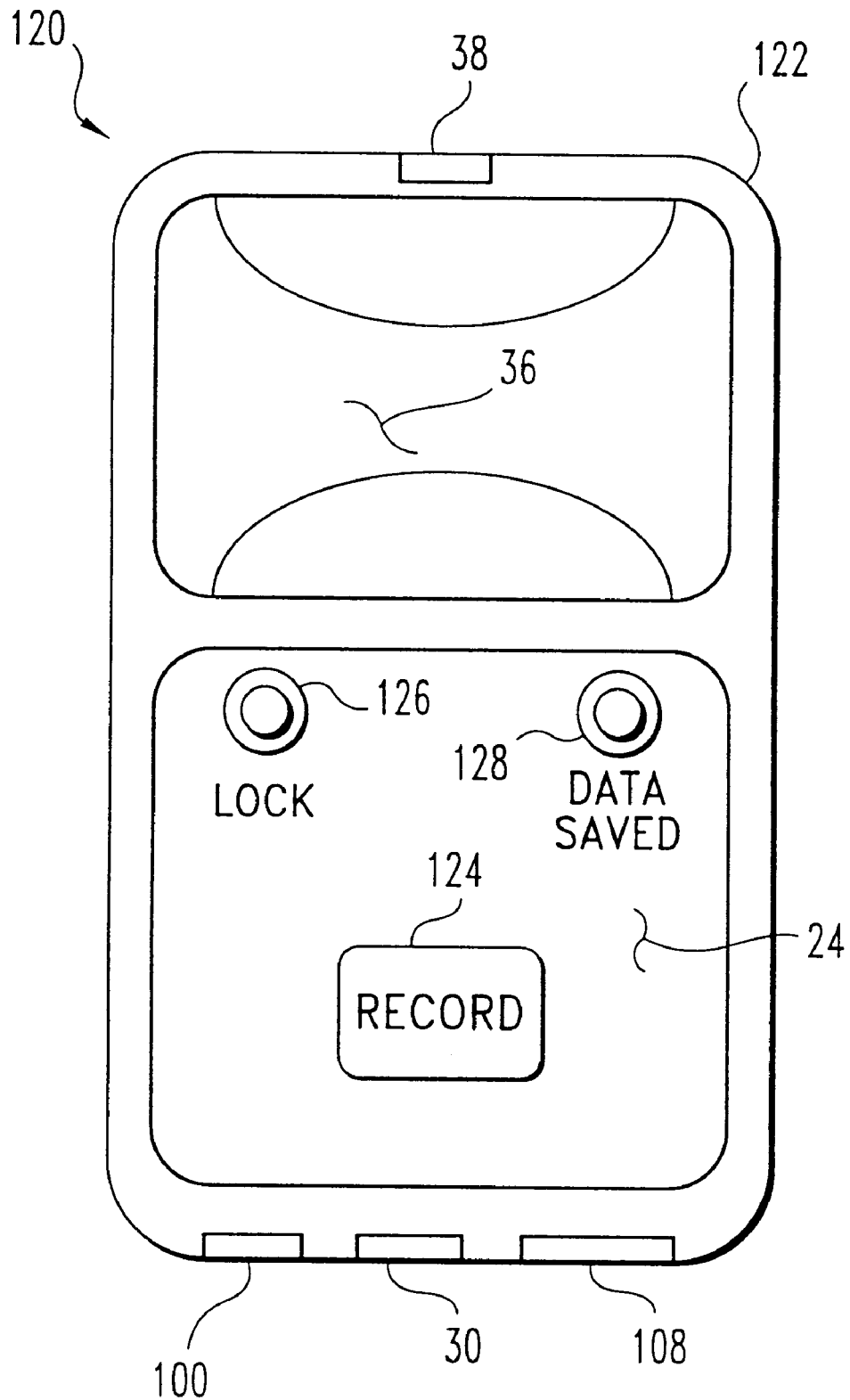
FIG. 2 is a front elevational view of one embodiment of the position and time-at-position logging apparatus of FIGS. 1A and 1B.

Referring now to FIG. 2, one embodiment 120 of the TLL 12 is shown. The TLL 120 includes a housing 122, preferably formed of a lightweight material such as ABS or Polystyrene plastic, or the like. Housing 122 contains each of the components of TLL 12 as shown in FIG. 1A, although internal GPS antenna 36 is exposed for capturing GPS radio signals, and keypad 24 is exposed for operator access. The keypad 24 of TLL 120 includes an operator depressible "Record" key, or switch, 124, the status of which is monitored by processor 20 (not shown). Keypad 24 further includes a "Lock" indicator 126, preferably an LED, which is activated by processor 20 when actuation of the "Record" key 124 is inhibited. A second "Data Saved" indicator 128, also preferably and LED, is included as part of keypad 24 and is illuminated by processor 20 to indicate that processor 20 has successfully saved position and time-at-position information in response to depression of the "Record" key 124.

The external antenna connector 38 is attached to the top portion of the housing 122 adjacent to the exposed internal GPS antenna 36. The vehicle data communication port 100, external power supply connector 30 and data communication port 108 are each attached to the lower portion of the housing 122 adjacent to the lower portion of the keypad 24.

Figure 3:
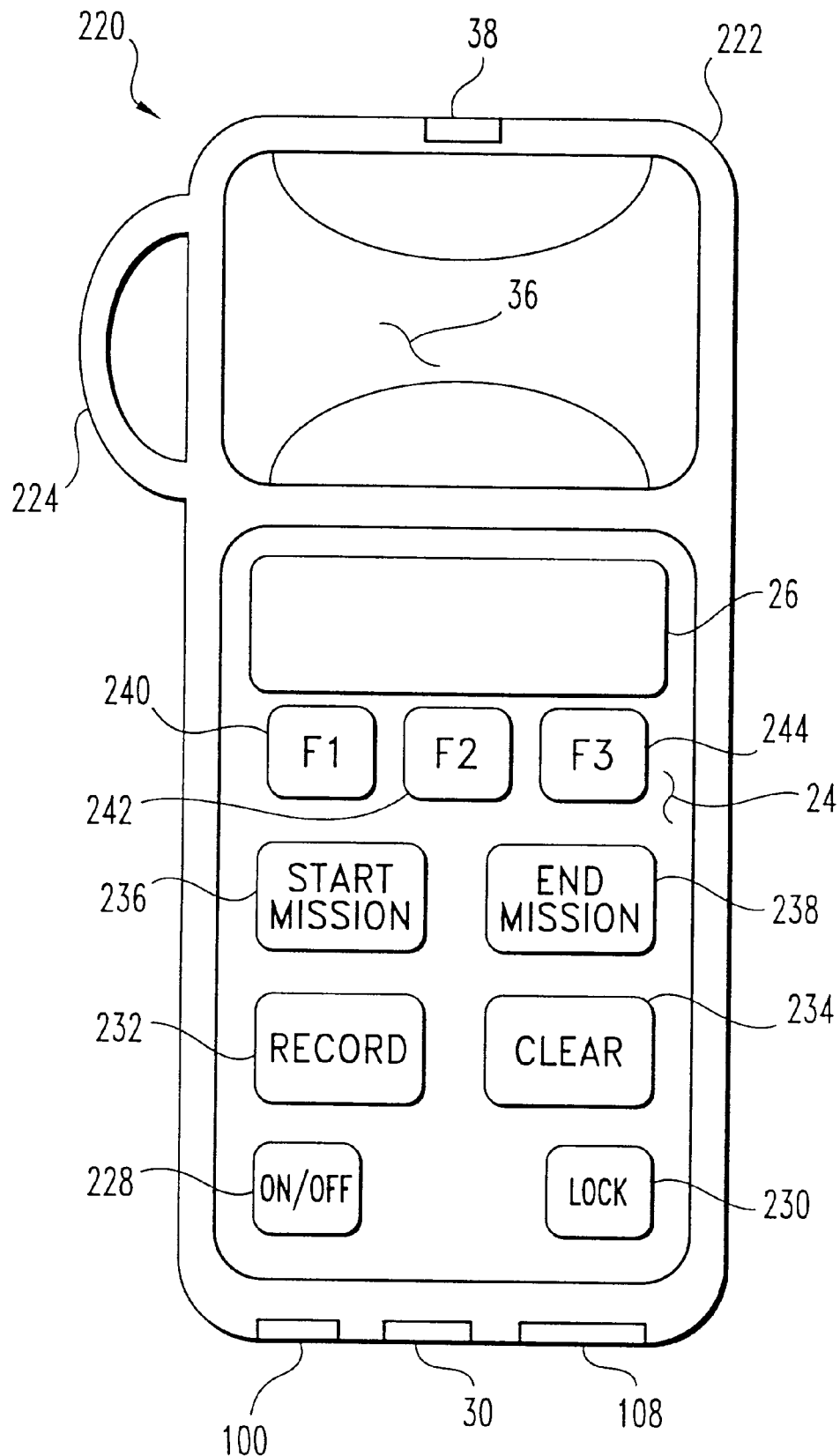
FIG. 3 is a front elevational view of an alternate embodiment of the position and time-at-position logging apparatus of FIGS. 1A and 1B.

Referring now to FIG. 3, another embodiment 220 of the TLL 12 is shown. The TLL 220 includes a housing 222, preferably formed of a lightweight material such as ABS or Polystyrene plastic, or the like. Housing 222 contains each of the components of TLL 12 as shown in FIG. 1A, although internal GPS antenna 36 is exposed for capturing GPS radio signals, and keypad 24 is exposed for operator access. Housing 222 includes a locking attachment 224 for securing housing 222 to another structure.

Keypad 24 is more complex than the keypad embodiment illustrated in FIG. 2 and includes a plurality of depressible keys and a display unit 26. Preferably, keypad 24 includes an "On/Off" switch 228 which is operable to permit primary power supply 28 to power TLL 220 in the "On" position, and to inhibit primary power supply 28 from powering TLL 220 in the "Off" position. A "Lock" key 230 is operable in one position to permit processor 20 to recognize actuation of any of the remaining keys on keypad 24 by enabling the keypad 24 for operation, and in an opposite position to ignore actuation of any of the remaining keys on keypad 24 by disabling keypad 24. A "Record" key 232 is provided an operates identically to the "Record" key 124 of FIG. 2. A "Clear" key 234 is actuatable to clear a context function provided by depressing one of the "F" keys 240, 242 or 244.

A "Start Mission" key 236 is actuatable to signal processor 20 to clear all position and time-at-position data from memory 22 and begin a new position and time-at-position information collection "mission". In a similar fashion, an "End mission" key 238 is actuatable to signal processor 20 to save all position and time-at-position data within memory 22 for later recall. Context function keys F1 240, F2 242 and F3 244 are each actuatable to signal processor 20 to perform a programmed function. For example, any one of the context function keys may be programmed to signal the processor to reconfigure mission parameters, which will be discussed in greater detail hereinafter with respect to programming the TLL, take a "snapshot" of position and time-at-position data, enable a "bread crumb" mode of operation wherein position of the TLL may be periodically tracked, switch the TLL to an automatic mode of operation, or switch the TLL to a manual mode of operation. The present invention further contemplates that any one of the context function keys may be programmed to alert command central 90 of an emergency condition and provide corresponding position and time-at-position data thereto, send any of a variety of messages to command center 90 such as estimated time of arrival (ETA), job complete status signal, current position, daily log data, job parameters, and the like. The context function keys may further be programmed to instruct a peripheral unit connected to data communications port 108 to input data, or output data. The context function keys may be still further programmed to provide for maneuverability within a menu driven operational or programming sequence provided on display 26. Thus, for example, context function keys 240–244 may be used in such a mode to cursor, scroll and/or select particular items within the menu.

OPERATIONAL DESCRIPTION

Figure 4:
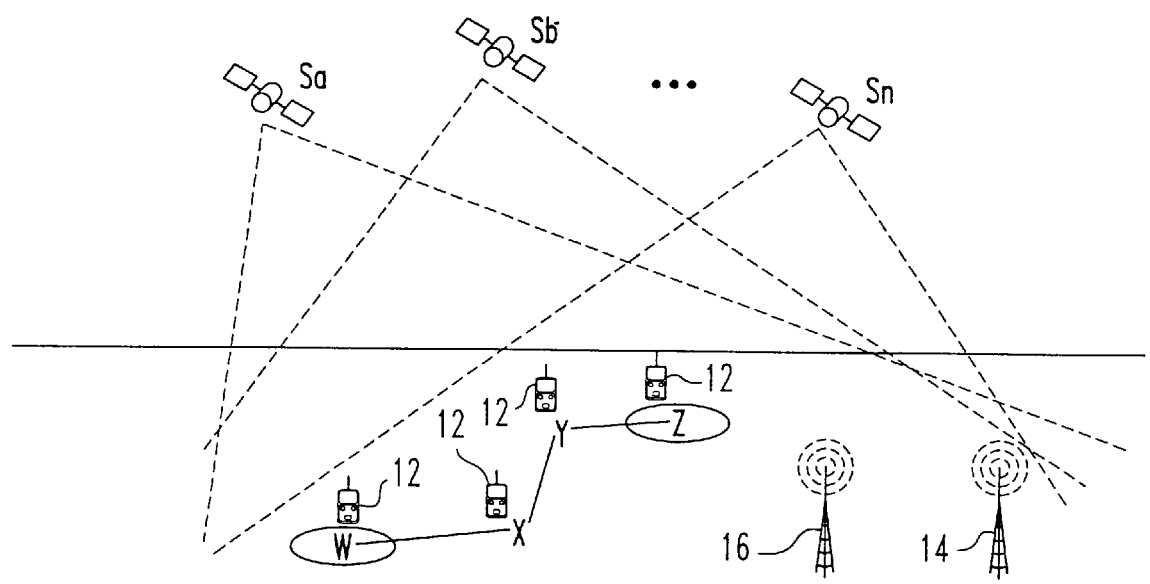
FIG. 4 is a diagrammatic illustration of a preferred application of the position and time-at-position logging system of the present invention.
Figure 4:
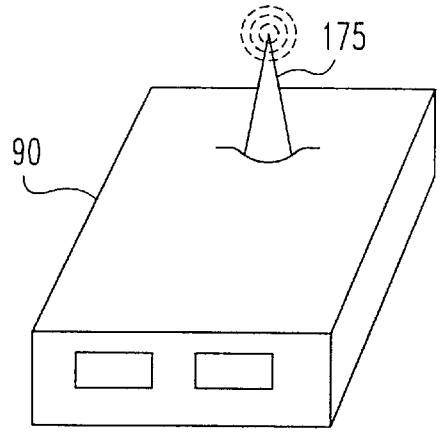

Referring now to FIG. 4, some of the various operational modes of the TLL 12 and of system 10, with reference to the hardware components of FIGS. 1A–3, will be described in detail. In general, FIG. 4 shows a number of earth orbiting satellites $S_a$–$S_n$, preferably GPS satellites, continuously broadcasting, or transmitting, GPS radio signals toward the earth. The TLL 12 is used to record, as described hereinafter, the position of the TLL 12 and the time at which the TLL resides at the recorded position at various points w, x, y and z on the earth's surface. At each of the various points, the position of the TLL 12 is logged according to latitudinal, longitudinal and altitudinal coordinates, although the present invention contemplates that any known grid system may be used. Likewise, the time at which the TLL 12 resides at any of the recorded positions is also logged, preferably in accordance with calendar date and time of day information including hours, minutes, seconds and milliseconds.

Although not strictly necessary for the operation of TLL 12, FIG. 4 also shows inclusion of an optional differential fixed station 16 for providing position correction information to TLL 12, and an optional fixed command center 14 for communicating, via radio link, with TLL 12. Fixed command center 90 includes a radio link antenna 175 for communicating with TLL 12 via fixed/mobile command center 14 as previously described.

Operational Mode Programming:

The TLL 12 may be programmed to log position and time-at-position data in accordance with any one of a variety of operational modes. Any known technique may be used to program the particular operational mode. For example, a software program corresponding to the desired operational mode may be loaded into memory by an external source. Preferably, however, memory unit 22 contains a number of software programs therein, each corresponding to a different operational mode. A programming signal may then be received, or generated by TLL 12, as discussed below, to enable execution of the desired software program by processor 20.

The present invention contemplates that the TLL 12 may be programmed to operate in either a manual operational mode or an automatic operational mode. In the manual operational mode, the TLL 12 will record position of the TLL 12 and the time at which the TLL 12 resides at the recorded position in response to an operator depression of one of the keys, or switches, forming part of keypad 24. Preferably, the TLL 12 records the position and time-at-position information in response to an operator depression of the "Record" key 124 (FIG. 2) or 232 (FIG. 3), although the present invention contemplates that other keys, such as any of the context function keys 240–244 (FIG. 3) may be used for this purpose as well.

In the automatic operational mode, the TLL 12 will record the position of the TLL 12 and the time at which the TLL 12 resides at the recorded position in response to a data capture signal provided to processor 20. As will be discussed in greater detail in the next section, the data capture signal may be provided by an external source, or by processor 20, in response to a predefined event. Thus, the TLL 12 may be programmed to operate in any one of a number of automatic modes.

Regardless of the desired operational mode, the TLL 12 may be programmed for operation in accordance with a number of programming modes. For example, in a first programming mode, the TLL 12 is connected directly to the PC 92-98 of the command center 90 via data communications port 108. The PC 92-98 is configured to transmit and receive data and may therefore provide processor 20 with a programming signal, or sequence of signals, to which processor 20 is responsive to enable the software program in memory 22, corresponding to the desired mode of operation, for execution by processor 20. Preferably, the PC 92-98 includes a menu-driven operator interface to facilitate the programming of TLL 12 in accordance with this first programming mode.

In a second programming mode, data corresponding to the desired mode of operation are contained on a storage medium 114 which is read by electronic reading device 110 connected to data communications port 108. The storage medium 114 may be a card having a magnetic stripe containing the information, in which case device 110 is a magnetic stripe reader, a so-called "smart" card having a memory component containing the information, in which case device 110 may be a proximity reader, an item having a bar code associated therewith, in which case device 110 is a bar code reader, although the present invention contemplates that any known storage mechanism and associated reading device may be used to extract desired programming information therefrom. In any event, the electronic reading device 110 is operable to convert the information contained on the storage medium 114 into the programming signal, or sequence of signals, which are provided to processor 20 via data communications port 108. The processor 20 is then responsive to the programming signal(s) received at data communications port 108 to enable the software program in memory 22, corresponding to the desired mode of operation, for execution by processor 20.

In a third programming mode, the PC 92-98 provides the programming signal, or sequence of signals, to the radio transceiver 78 of fixed or mobile command center 14, either via cell phone/base station 84 or land line/public access medium 86. With radio communications established between radio transceiver 78 of fixed or mobile command center 14 and radio transceiver 72 of TLL 12, radio transceiver 78 is operable to provide the programming signal(s) to radio transceiver 72 which, in turn, provides these signals to processor 20. The processor 20 is responsive to the programming signal(s) received from PC 92-98 via radio transceivers 72 and 78 to enable the software program in memory 22, corresponding to the desired mode of operation, for execution by processor 20.

In a fourth programming mode, memory unit 22 includes a software program executable by processor 20 to provide a menu-driven programming feature. In accordance with this fourth programming mode, a user may maneuver through the menu displayed on display 26 (FIG. 3), preferably using the context function keys 240–244, to choose therefrom a desired mode of operation. The processor 20 is responsive to the menu choice to generate the corresponding programming signal(s), and is further responsive to the the programming signal(s) generated thereby to enable the software program in memory 22, corresponding to the desired mode of operation, for execution by processor 20.

In a fifth programming mode, processor 20 is responsive to predetermined level or range of any one, or combination of, engine/vehicle operating parameters available on vehicle data communications link 104 to program a particular operational mode. In accordance with this fifth programming mode, processor 20 monitors the vehicle/engine operating parameters available on vehicle data communications link 104 and generates the corresponding programming signal(s) in response to one or more of the vehicle/engine operating parameters achieving a predetermined value or achieving a value within a predetermined range. Processor 20 is then further responsive to the the programming signal(s) generated thereby to enable the software program in memory 22, corresponding to the desired mode of operation, for execution by processor 20.

As one simple example of this fifth programming mode, it may be desirable in the engine/vehicle development art to capture position and time-at-position information of the vehicle every time the engine operating temperature exceeds a predefined temperature after warming up to a safe operating temperature. To accomplish this end, processor 20 monitors the engine temperature parameter on the vehicle data communications link 104. When the engine temperature rises to with a range of normal operating temperatures, processor 20 is responsive thereto to generate a programming signal(s) corresponding to a desired operational program. Thereafter, processor 20 is responsive to the programming signal(s) to enable a software program in memory 22, corresponding to a program which monitors engine temperature and logs position of the vehicle and the time at the logged position every time the engine temperature exceeds a predefined temperature or temperature range, for execution by processor 20.

Data Logging Criteria:

In any of the various operating modes discussed herein, the TLL 12 is operable to continuously calculate its position and time at the calculated position in real time as long as it is positioned such that the internal GPS antenna 36, or the external GPS antenna 40 connected thereto, has a clear "view" of the sky. In a preferred embodiment, processor 20 receives GPS radio signals from GPS receiver approximately once every second. In the embodiment illustrated in FIG. 3, display 26 is operative to indicate when satellite data is available and when the operator, in the manual mode of operation, has correctly triggered a data collection cycle.

Once received, processor 20 is preferably operable, as is known in the art, to process the radio signals received from the GPS satellites and determine therefrom positional data in terms of latitudinal, longitudinal and altitudinal coordinates of the TLL 12, and to determine a time at which the TLL 12 resides at the determined position in terms of calendar date, hours, minutes, seconds and milliseconds. The time information is accurate to within one millisecond, and the positional data is typically accurate to within a few meters if the optional differential fixed station 16 is used to improve the positional calculations.

In the manual mode of operation, the TLL 12 is operable to record position and time-at-position information in memory 22, and maintain such information, for a number of locations. As an example of one application of the TLL 12 programmed for manual operation, with reference to FIG. 4, an operator carries the TLL during travel to, for example, a worksite z or a series of service stops x, y and z. Before leaving home base w, the operator depresses the "Record" key 124 (FIG. 2) or 232 (FIG. 3), or alternatively an appropriate one of the context keys 240–244 (FIG. 3), at a location where the internal GPS antenna 36, or external GPS antenna 40 connected thereto, has a clear "view" of the sky. In response thereto, processor 20 captures a corresponding position and time-at-position and stores this information in memory 22. At each stop x, y and z, such as delivery or service stops, the operator may manually record position and corresponding time by pressing the appropriate key on keypad 24 to mark log arrival and departure times at the particular location. The memory unit 22 of TLL 12 has sufficient memory capacity to maintain such position and time-at-position information for multiple points. As will be described in greater detail in the next section, individual instances or sets of stored information may be subsequently downloaded for analysis and reporting.

The TLL 12 is further capable of operation in accordance with a number of automatic operational modes. In each automatic mode of operation, the processor 20 is responsive to a data capture signal corresponding to a predefined event to log (record) the position of the TLL 12 and the time at which the TLL 12 resides at the logged position in memory 22. In a first automatic operational mode, the data capture signal is provided by processor 20 itself in accordance with a predefined time function. For example, processor 20 may be programmed to operate in a so-called "bread crumb" mode wherein processor 20 periodically wakes up and logs a position and time-at-position data set within memory 22. Further, processor 20 may be programmed to monitor the time of day information forming part of the GPS data provided thereto by GPS receiver and begin such timed function data capture at a predefined time of day. As another example, processor 20 may be programmed to periodically record a position and time-at-position data set after a first predefined event occurs. As a specific example of the latter example, processor 20 may be programmed to monitor the vehicle data communications link 104 and begin periodically capturing position and time-at-position data sets after processor detects vehicle ignition on link 104.

In a second automatic operational mode, the processor 20 may be programmed to monitor the positional data provided thereto by GPS receiver 34 and generate one or more data capture signals when the positional data indicates adjacency to a predefined landmark, or entrance into a predefined zone, or the like. In response to the one or more data capture signals, processor 20 logs position and time-at-position data corresponding thereto into memory 22.

In a third automatic operational mode, PC 92-98 of command center 90 may provide the data capture signal to radio transceiver 78 via either cell phone/base station 84 or land line/public access medium 86. As described above with respect to the third programming mode, radio transceiver 78 provides the data capture signal to processor 20 via radio communication with radio transceiver 72 of the TLL 12. The processor 20 is responsive to the data capture signal to log the position and time-at-position data set corresponding thereto within memory 22. Thus, at any time, and in accordance with any criterion, PC 92-98, or any data capture signal source in place thereof, may generate a "snapshot" data capture signal to which processor 20 is responsive to log the position and time-at-position data set corresponding thereto within memory 22.

In a fourth automatic operational mode, the data capture signal is provided by the electronic reading device 110 to data communications port 108 and, in turn, to processor 20. In response to the data capture signal provided thereto by electronic reading device 110, processor 20 is operable to log a position and time-at-position data set corresponding thereto within memory 22. The electronic reading device 110 may be, as previously discussed, a magnetic stripe card reader, a proximity card reader, a barcode reader or the like. The card thus used may be, for example, a credit card, a "key" card, an identification badge or any such card. The barcoded item, on the other hand, may be any item having a barcode associated therewith. As with operational modes previously discussed, the present invention further contemplates combining the third operational mode with any other of the operational modes discussed herein. For example, a worksite supervisor may be interested in the times at which workers leave the site for the day. In accordance with the first automatic mode of operation, processor 20 may be programmed to be enabled to accept data capture signals at, for example, 4:30 p.m. In accordance with this fourth automatic mode of operation, if the electronic reading device is an employment badge detector, then the TLL 12 will log a position and time-at-position data set each time a worker clocks out. Thus, by reviewing the data sets, the supervisor will be able to determine the respective times at which the workers leave the worksite for the day.

In a fifth automatic operational mode, the data capture signal is provided by processor 20 in accordance with detected values of certain ones of the vehicle/engine operational parameters available on the vehicle data communications link 104. In this fifth automatic operational mode, processor 20 monitors desired ones of the vehicle/engine operational parameters and generates the data capture signal when one or more of the vehicle/engine operational parameters achieves a predefined value or falls within a predefined range of values. In response to the data capture signal, the processor 20 is operable to log a position and time-at-position data set corresponding thereto within memory 22.

As one specific example of this fifth automatic operational mode, a fleet vehicle owner or supervisor may wish to determine where and when certain fleet drivers exceed a predefined speed limit. The processor 20 of the TLL 12 located in the particular vehicle may thus be programmed to monitor the vehicle data communications link 104 for vehicle speed and to generate the data capture signal every time the predefined speed limit is exceeded. In response to the data capture signal, the processor 20 then logs the corresponding position and time-at-position into memory 22. As with operational modes previously discussed, the present invention further contemplates combining this fifth operational mode with any other of the operational modes discussed herein. For example, it may be desirable in the motor sports art to monitor vehicle speeds in speed limited areas such as pit entrances and exits. In accordance with the second automatic operational mode, the processor 20 of a TLL 12 onboard the vehicle may be programmed to monitor vehicle positional data and to generate a data capture signal when the vehicle passes a certain range of coordinates corresponding to the pit entrance. Thereafter, the processor may monitor, in accordance with the fifth automatic operational mode, vehicle speed data provided on the vehicle data communications link 104. When the predefined speed limit is exceeded, processor 20 is responsive thereto to log a second corresponding position and time-at-position. In this manner, the time at which the vehicle entered the pit and the time and position at which the pit speed limit was exceeded may be easily determined.

Data Output and Reporting:

As previously discussed, the TLL 12 is operable to store many position and time-at-position data sets in memory 22. In accordance with another aspect of the present invention, system 10 is configured for flexible data extraction, data processing and data reporting.

In accordance with a first mode of data extraction, the TLL 12 may be connected to the PC 92-98 of command center 90 via data communications port 108. The PC 92-98 is operable to communicate with processor 20 and thereby download data from memory 22 into memory internal to PC 92-98 as is known in the art. The PC 92-98 preferably includes a known PC-based database program operable to receive the downloaded data and process the data to generate reports thereon. For example, the present invention contemplates that individual and group statistics for single or multiple trips may be generated by the database program for display in graphical or tabular form on monitor 92.

The present invention contemplates that the database program may further merge individual user data to provide an administrator with group statistics and user performance statistics. Data reporting may further be stored for later use on known storage media, or may alternatively be printed in hardcopy form using a printer associated with PC 92-98 (not shown). In accordance with concepts described herein, the database program may further automatically tally activity for one or more TLL 12 users, automatically provide billing information, automatically provide for expense reports, automatically provide for time card maintenance and payroll generation, automatically provide for job site/GPS grid correlation and identification tracking, and automatically provide for mission violation tracking, and the like. The database program should preferably include sorting and searching capability, archive utilities and capability for storing frequently used sorts, searches and reports.

In accordance with a second mode of data extraction, PC 92-98 of command center 90 may further provide a data extraction request to TLL 12 via radio transceiver 78. In so doing, PC 92-98 may provide radio transceiver 78 with with a data extraction request via cell phone/base station 84 or via land line/public access medium 86. In either case, the radio transceiver 78 transmits the data extraction request, which transmission is received by radio transceiver 72 and, in turn, provided to processor 20. Depending upon the type of data extraction request provided by PC 92-98, processor may, in turn, provide (download) data back through the radio signal path in accordance with a number of data formats. For example, only a single data set, corresponding to the real-time instantaneous position and time-at-position of TLL 12, may be requested by PC 92-98, in which case processor 20 transmits the current position and time-at-position back to PC 92-98 via radio transceivers 72 and 78. As another example, PC 92-98 may request a group of position and time-at-position data sets, in which case processor 20 transmits the corresponding group of data sets to PC 92-98 via radio transceivers 72 and 78. As a further example, PC 92-98 may request that processor 20 periodically provide single instances or groups of position and time-at-position data sets back to PC-92-98.

In accordance with a third mode of data extraction, data output device 112 may be connected to processor 20 via data communications port 108. As such, data output device 112 may extract, or download, data from memory 22 via processor 20 in accordance with a data extraction request. As discussed with respect to the second mode of data extraction, data output device may request any combination of data sets, and a various specified times. The present invention contemplates that data output device 112 may be any known data output device, although specific examples of device 112 include, but are not limited to, a barcode printer, a ticket printer, a receipt printer, a portable display monitor, and any storage media including magnetic tapes, CD ROMs and the like.

In accordance with a fourth data extraction mode, processor 20 is responsive to actuation of any one of keys 240–244, or to a data extraction signal provided thereto by an external source such as PC 92-98, electronic reading device 110 or vehicle/engine control computer 102, to download certain ones of the position and time-at-position data sets from memory 22, process these data sets in accordance with a report generating software algorithm stored in memory 22, and provide th processed data to to display 26 for viewing.

Operational Flowchart:

All software algorithms for execution by TLL 12 are preferably written in accordance with a known programming language, such as "C" running under a windows-based environment. Referring now to FIGS. 5–9, one embodiment of a software operational program for TLL 12 operation, in accordance with some of the principles discussed hereinabove, is illustrated in flowchart form. The software program illustrated by the flowchart of FIGS. 5–9 is executable by processor 20 and may be stored in memory 22. The following description of the flowchart of FIGS. 5–9 will reference will be made to TLL 12 as illustrated in FIGS. 1A and 1B, and to the specific TLL 220 embodiment illustrated in FIG. 3. Those skilled in the art will, however, recognize that the software program illustrated in the flowchart may be easily adapted for operation with the TLL 120 embodiment illustrated in FIG. 2.

Figure 5:
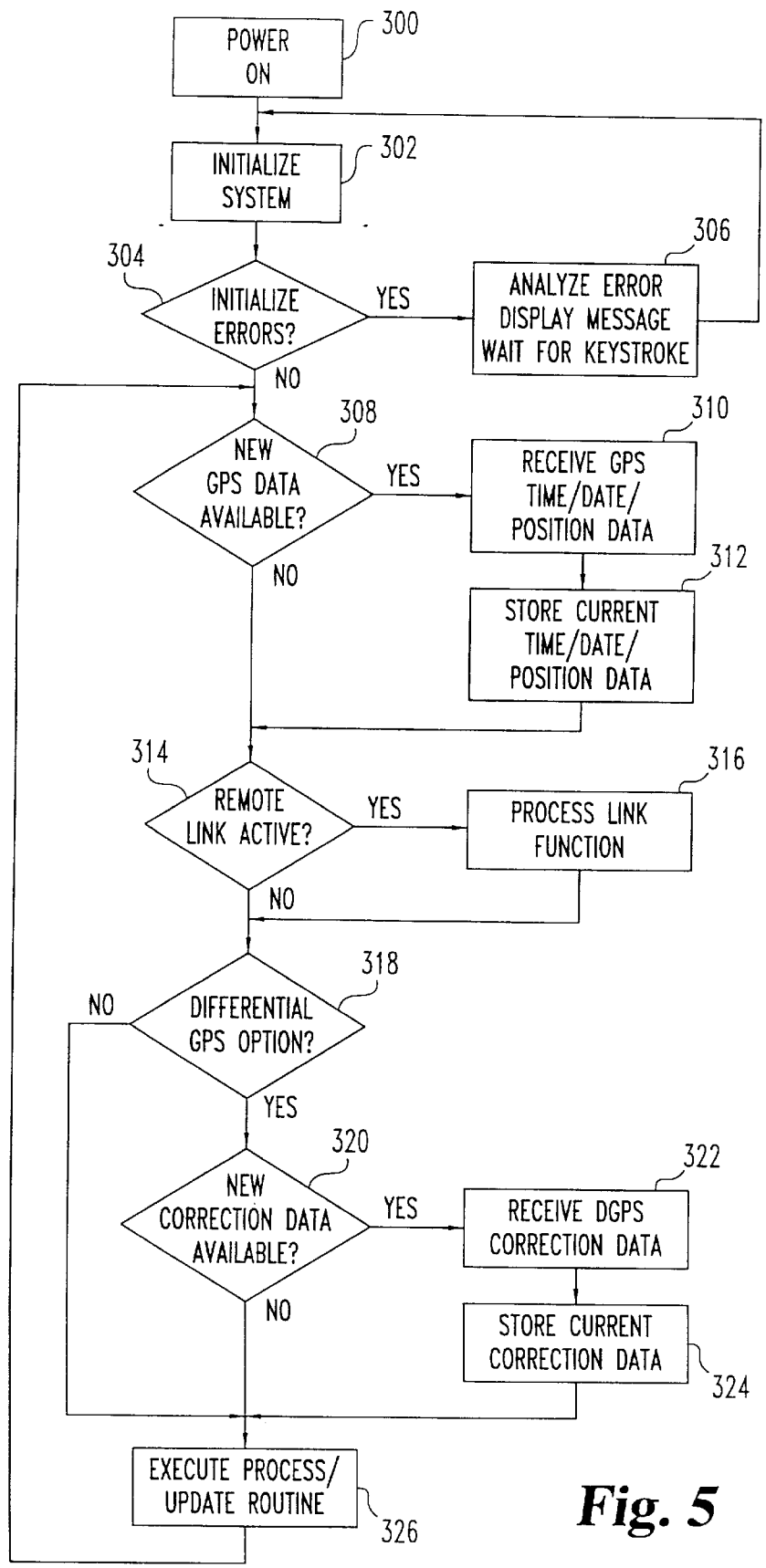
FIG. 5 is a flowchart illustrating a preferred embodiment of an operational algorithm executable by the position and time-at-position apparatus of FIGS. 1A and 1B.

Referring specifically to FIG. 5, the algorithm begins at step 300 with a "power on" condition which may be accomplished, for example, by depressing key 228 of FIG. 3. Program execution continues from step 300 at step 302 where the TLL 12 components are initialized as is known in the art. Thereafter, at step 304, the program checks for any initialization errors. If an initialization error is detected at step 304, the error is analyzed and a message is displayed, preferably on display 26 of FIG. 3, and program execution haults until a keystroke is received, after which program execution resumes at step 302.

If, at step 304, no initialization errors are detected, program execution continues at step 308 where processor 20 checks GPS receiver 34 to determine whether any GPS data is currently available. If so, GPS data is received by processor 20 at step 310 and processor 20 computes position and time-at-position data of the TLL 12 from the GPS signals. Thereafter, at step 312, processor 20 logs (stores) the computed positional and time-at-position data within memory 22. After step 312, and if no new GPS data is available at step 308, program execution advances to step 314.

Figure 6:
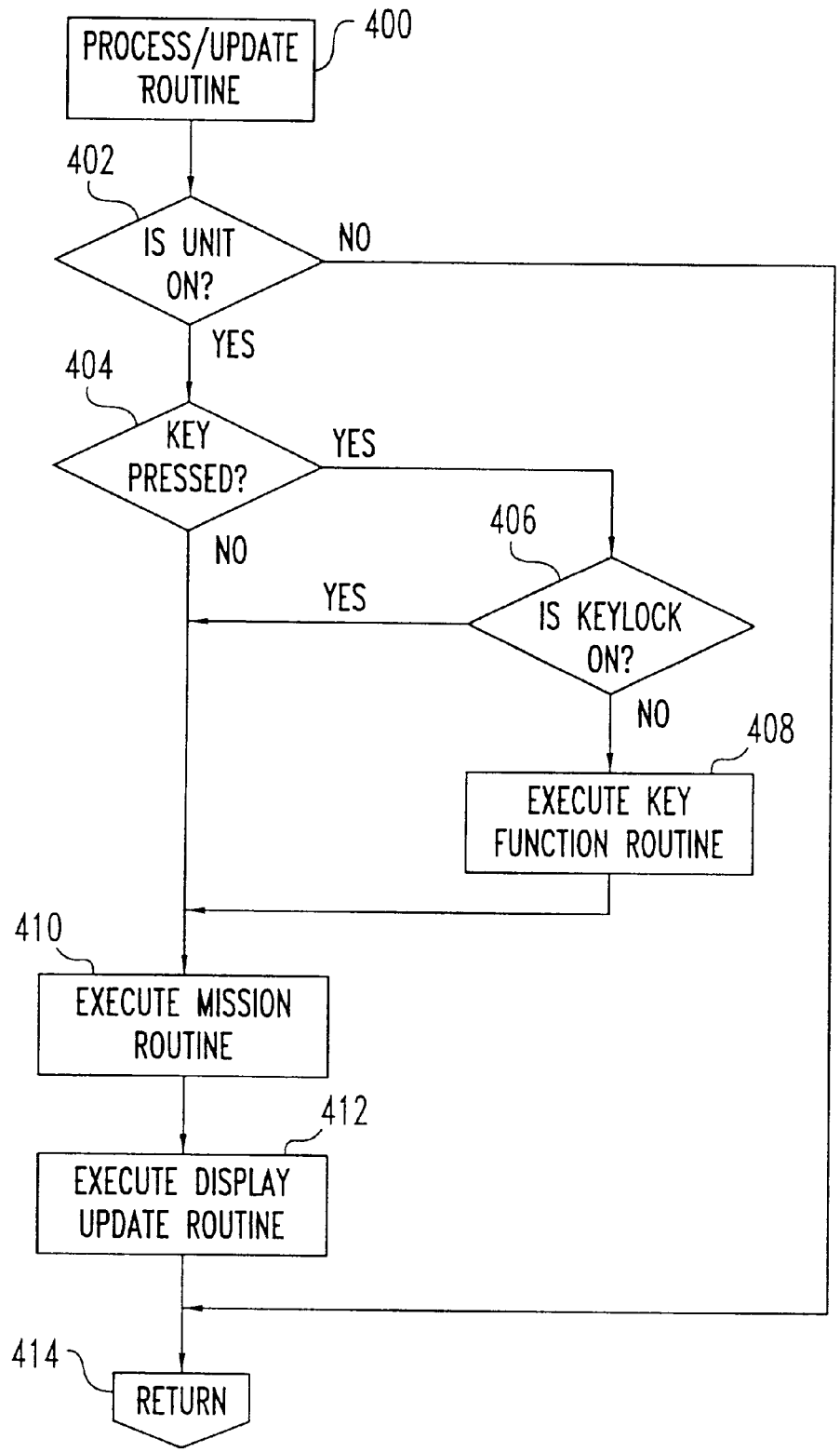
FIG. 6 is a flowchart illustrating a preferred embodiment of the process/update subroutine called by the flowchart of FIG. 5.

At step 314, processor 20 checks radio transceiver 72 to determine whether a remote link is active. If so, program execution continues at step 316 where the link function is processed by processor 20. At least some of the preferred link functions processible by processor 20 are described hereinabove with respect to the programmable operations, data capture operations and data extraction operations. After step 316, or if no remote link is active at step 314, program execution continues at step 318 where processor 20 determines whether the differential GPS option is available. If so, program execution advances to step 320 where processor 20 determines, by interrogating radio transceiver 44, whether new correction data is available from th differential fixed position station 16. If processor 20 determines at step 320 that new correction data is available, program execution advances to step 322 where processor 20 receives the differential GPS correction data from differential fixed position station 16 via radio transceiver 44. Thereafter at step 324, processor 20 stores the current correction data in memory 22. After step 324, or if no new correction data was available at step 320, program execution advances to step 326 where the process/update routine of FIG. 6 is called for execution. After the process/update routine of FIG. 6 returns to step 326, program execution loops back to step 308 to check for newly available GPS data.

Referring now to FIG. 6, the process/update routine called at step 326 of FIG. 5 begins at step 400, and at step 402 processor 20 checks the power status to determine whether the TLL 12 is "ON". If not, program execution jumps to step 414 to return to step 326 of FIG. 5. If, at step 402, the power to TLL 12 is "ON", program execution advances to step 404 where processor interrogates the keypad 24 to determine whether a key thereon has been pressed. If so, program execution advances to step 406 where processor 20 determines whether the keypad 24 is enabled. If, at step 406, the keylock is not on and the keypad 24 is therefore enabled, program execution advances to step 408 where processor 20 executes the key function subroutine illustrated in FIGS. 7A–7C. After program execution returns to step 408 from the key function subroutine, or if the keylock is on at step 406, and the keypad 24 is therefore not enabled, or if no key is detected as having been pressed at step 404, program execution continues at step 410. At step 410, processor 20 executes the mission subroutine illustrated in FIG. 9 and, after returning therefrom, processor 20 executes the display update subroutine illustrated in FIG. 8. After returning from the display update subroutine to step 412, program execution advances to step 414 to return to step 326 of FIG. 5.

Figure 7A:
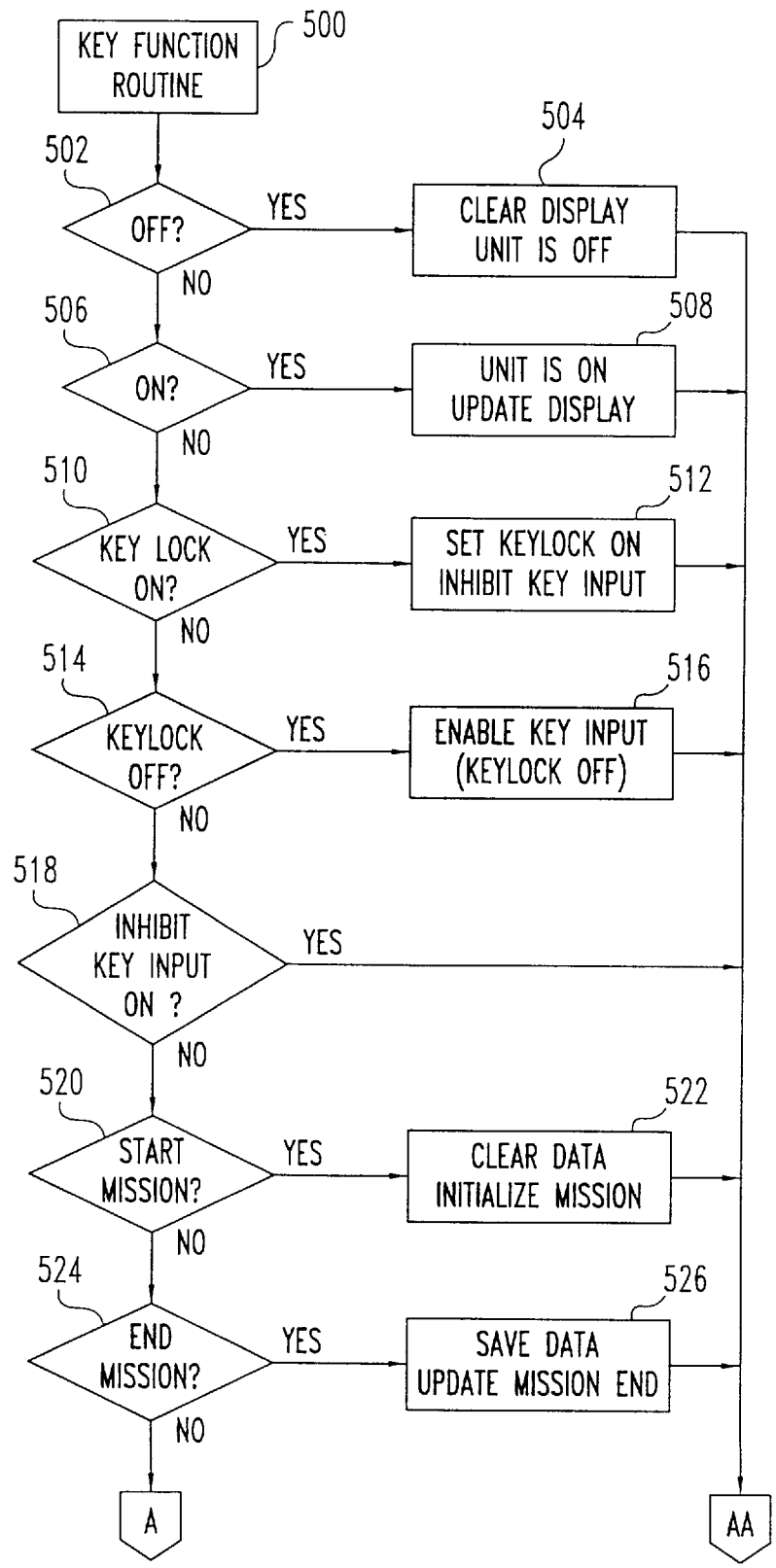
FIG. 7A is a flowchart illustrating a preferred embodiment of the key function subroutine called by the flowchart of FIG. 6.

Referring now to FIG. 7A, the key function subroutine called at step 408 of FIG. 6 begins at step 500, and at step 502, processor 20 determines whether electrical power to TLL 12 is disabled, preferably by determining the status of the "On/Off" key 228 of FIG. 3. If, at step 502, processor 20 determines that the power to TLL 12 is disabled, program execution advances to step 504 where processor 20 clears display 26 and continues to step 552 of FIG. 7C. If, at step 502, processor 20 determines that power to TLL 12 is not disabled, program execution advances to step 506 where processor 20 determines whether electrical power to TLL 12 is enabled, preferably by determining the status of the "On/Off" key 228. If, at step 506, processor determines that power to TLL 12 is enables, program execution advances to step 508 where processor 20 updates display 26 with the most recent information, and thereafter advances to step 552. If, at step 506, processor 20 determines that power to TLL 12 is not enabled, program execution advances to step 510.

At step 510, processor 20 determines whether the keylock is on, preferably by determining the status of the "Lock" key 230 of FIG. 3. If, at step 510, processor 20 determines that the keylock is "On", program execution advances to step 512 where processor 20 sets the keylock status to "On" and disables keypad 24 before advancing to step 552. If, at step 510, processor 20 determines that the keylock is not "On", program execution advances to step 514 where the "Lock" key is again tested by processor 20 to determine whether it is in the "Off" position. If, at step 514, processor 20 determines that the "Lock" key 228 is in the "Off" position then program execution advances to step 516 where processor 20 sets the keylock status to "Off" and enables keypad 24 before advancing to step 552. If, at step 514, processor 20 determines that the keylock is not "Off", program execution advances to step 518 where processor 20 tests the keylock status. If the keylock status indicates that the keypad 24 is disabled at step 518, then program execution advances to step 552. Otherwise, program execution advances to step 520.

At step 520, processor tests the status of the "Start Mission" key 236. If key 236 has been actuated, then program execution advances to step 522 where processor 20 clears all previous position and time-at-position data residing in memory 22 and initializes TLL 12 for a new "mission" or set of data. Program execution continues from step 522 at step 552. If, at step 520, key 236 has not been actuated, then program execution advances to step 524 where processor 20 tests the status of the "End Mission" key 238. If key 238 has been actuated, then program execution advances to step 526 where processor 20 saves all position and time-at-position data sets as a group thereof within memory 22 for later recall. Program execution continues from step 526 at step 552. If, at step 524, processor 20 determines that the "End Mission" key 238 has not been actuated, program execution advances to step 528.

Figure 7B:
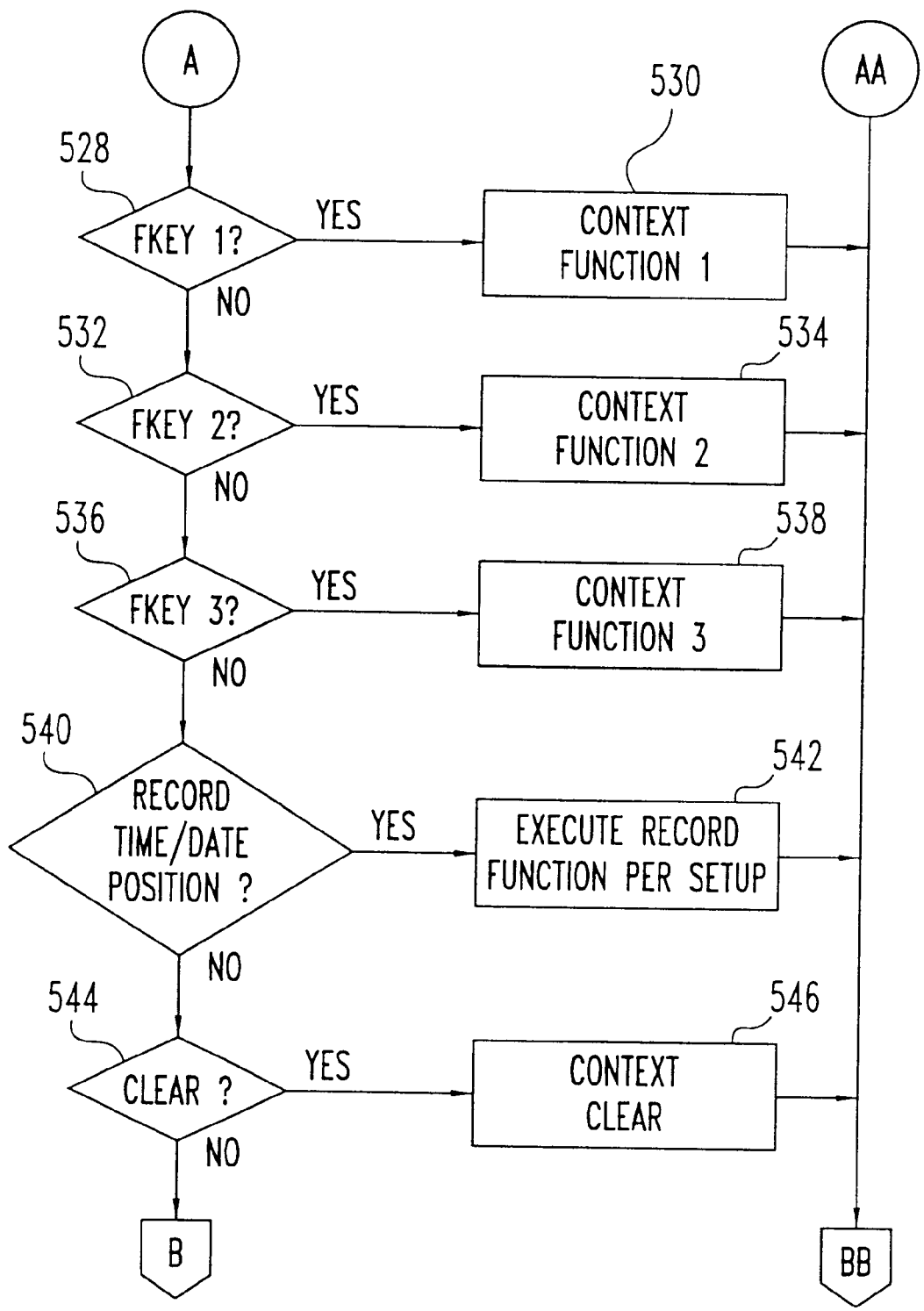
FIG. 7B is a continuation of the flowchart of FIG. 7A.

Referring now to FIG. 7B, processor 20 tests the status of context function key F1 240 at step 528. If, at step 528, processor 20 determines that key 240 has been depressed, then program execution continues at step 530 where processor 20 executes the function associated with the F1 key 240 before advancing to step 552. If, at step 528, processor 20 determines that the F1 key 240 has not been actuated, program execution advances to step 532 where processor 20 tests the status of context function key F2 242. If, at step 532, processor 20 determines that key 242 has been depressed, then program execution continues at step 534 where processor 20 executes the function associated with the F2 key 242 before advancing to step 552. If, at step 532, processor 20 determines that the F2 key 242 has not been actuated, program execution advances to step 536 where processor 20 tests the status of context function key F3 244. If, at step 536, processor 20 determines that key 244 has been depressed, then program execution continues at step 538 where processor 20 executes the function associated with the F3 key 244 before advancing to step 552. If, at step 536, processor 20 determines that the F3 key 244 has not been actuated, program execution advances to step 540.

As described hereinabove, the context function keys 240–244 may each be programmed for a number of specific functions. For example, any one of the keys 240–244 may be programmed to cause processor 20 to, in response to actuation thereof, reconfigure mission parameters and locations, log "snapshot" data into memory 22 corresponding to the current position and time-at-position of TLL 12, enter a "bread Crumb" mode of operation by tracking position and time-at-position of TLL 12 by periodically logging such data into memory 22, enter any one of the automatic operational modes, enter a manual operational mode, send any one of a variety of messages to command center 90 including ETA, job complete, job parameters, emergency message and location, and the like, transmit current position via radio transceiver 72 or data communications port 108, transmit daily log data via radio transceiver 72 or data communications port 108, read data from electronic reading device 110, or output data from data output device 112. The present invention contemplates that keys 240–244 may be programmed to perform other functions as well, such as, for maneuvering through a menu within display 26. Other such uses of keys 240–244 will become apparent to those skilled in the art.

Returning now to the flowchart of FIG. 7B, program execution continues at step 540 where processor 20 tests the status of the "Record" key 232 and advances to step 542 if key 232 was actuated. At step 542, processor 20 logs the position and time-at-position of TLL 12 in memory 22 in accordance with the particular program setup as discussed hereinabove. If processor 20 determines, at step 540, that the "Record" key 232 has not been actuated, then program execution continues at step 544 where the status of the "Clear" key 234 is tested. If, at step 544, processor 20 determines that key 234 has been actuated, then program execution advances to step 546 where processor 20 clears (disables) a context function provided by depression of one of keys 240–244 before advancing to step 552. If, at step 544, processor 20 determines that key 234 has not been actuated, then program execution advances to step 548.

Figure 7C:
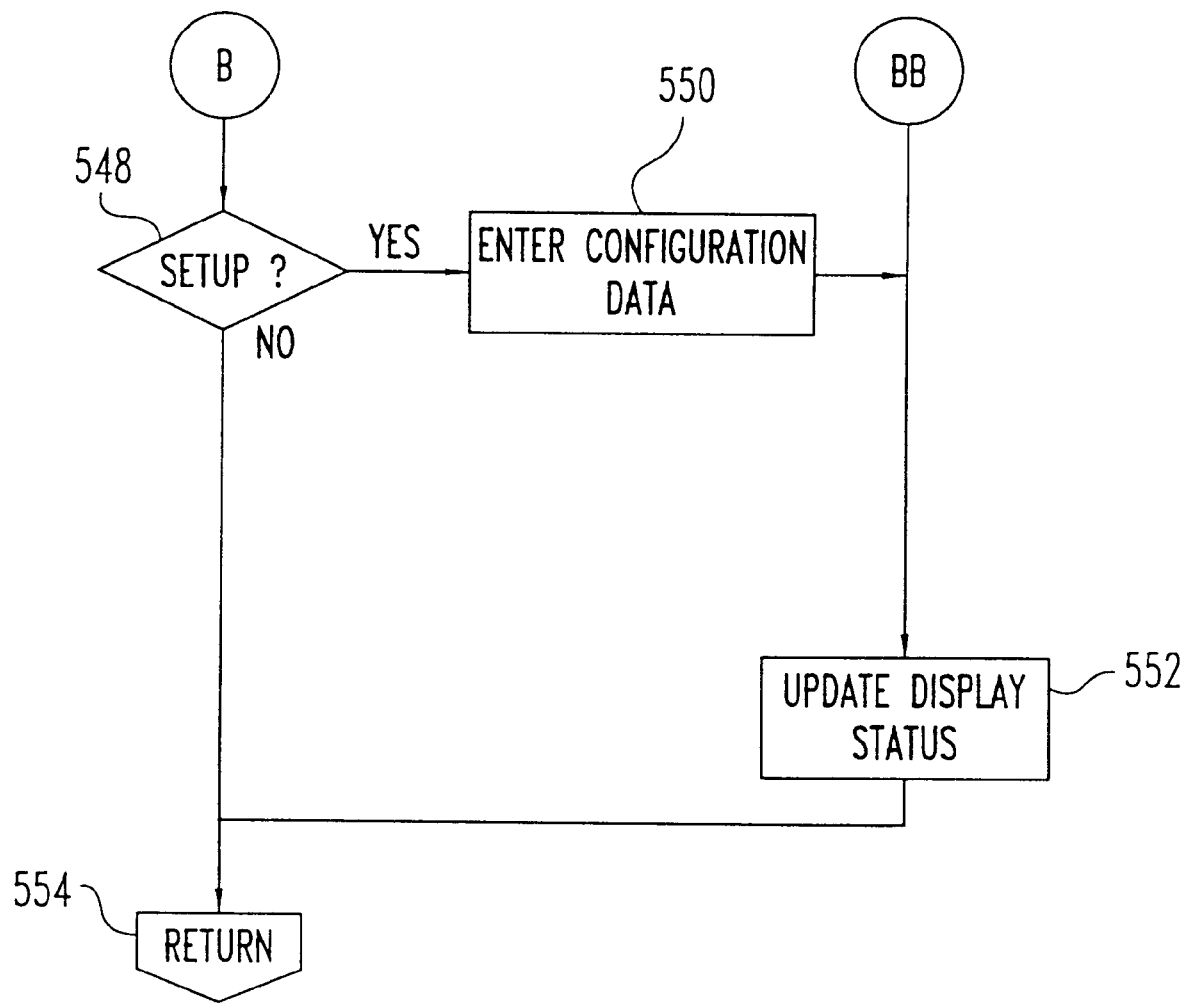
FIG. 7C is a continuation of the flowchart of FIG. 7B.

Referring now to FIG. 7C, processor executes step 548 by testing a "Setup" status flag within processor 20. If the "Setup" flag indicates that processor 20 has received a programming signal or signals from any of the sources previously described herein, then program execution advances to step 550 where configuration data is entered. The configuration data entered at step 550 may include, but is not limited to, any of a user ID, operating mode (any of the various manual or automatic operating modes, and reporting modes), alarm conditions, security clearance information, data communication port 108 status, vehicle data communication port 100 status, wireless communication link 70 data such as data relating to the particular communication channel used, access telephone numbers and the like, GPS parameters such as location and time initialization data, mission parameters such as stop locations, route information, goal and/or limits data, and peripheral configuration data relating to the various I/O devices. Program execution advances from step 550 to step 552 where the status of display 26 is updated to reflect all activity occurring within the key function subroutine. Program execution advances from step 552, and from step 548 if the "Setup" flag indicates that processor 20 has not received a programming signal or signals from any of the sources previously described herein, to step 554 where program execution is returned to step 408 of FIG. 6.

Figure 8:
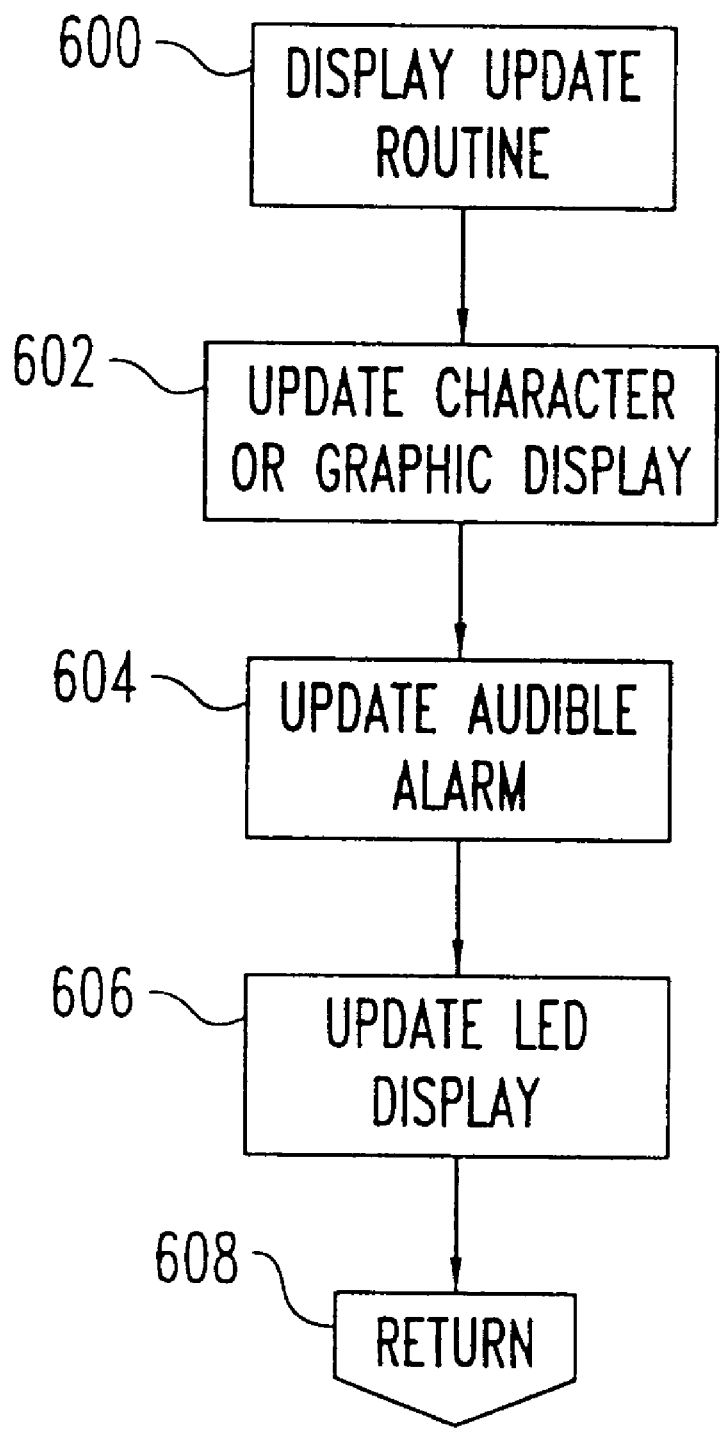
FIG. 8 is a flowchart illustrating a preferred embodiment of the display update subroutine called by the flowchart of FIG. 6.

Referring now to FIG. 8, the display update subroutine called at step 412 of FIG. 6 begins at step 600, and at step 602, the character and/or graphic portion of display 26 is updated to reflect all activity since previously updating these portions. Thereafter at step 604, an internal audible alarm is updated to reflect any changes in alarm condition. Thereafter at step 606, any LED portion of display 26 is updated to reflect all activity since previously updating this portion. Program execution advances from step 606 to step 608 and returns to step 412 of FIG. 6.

Figure 9:
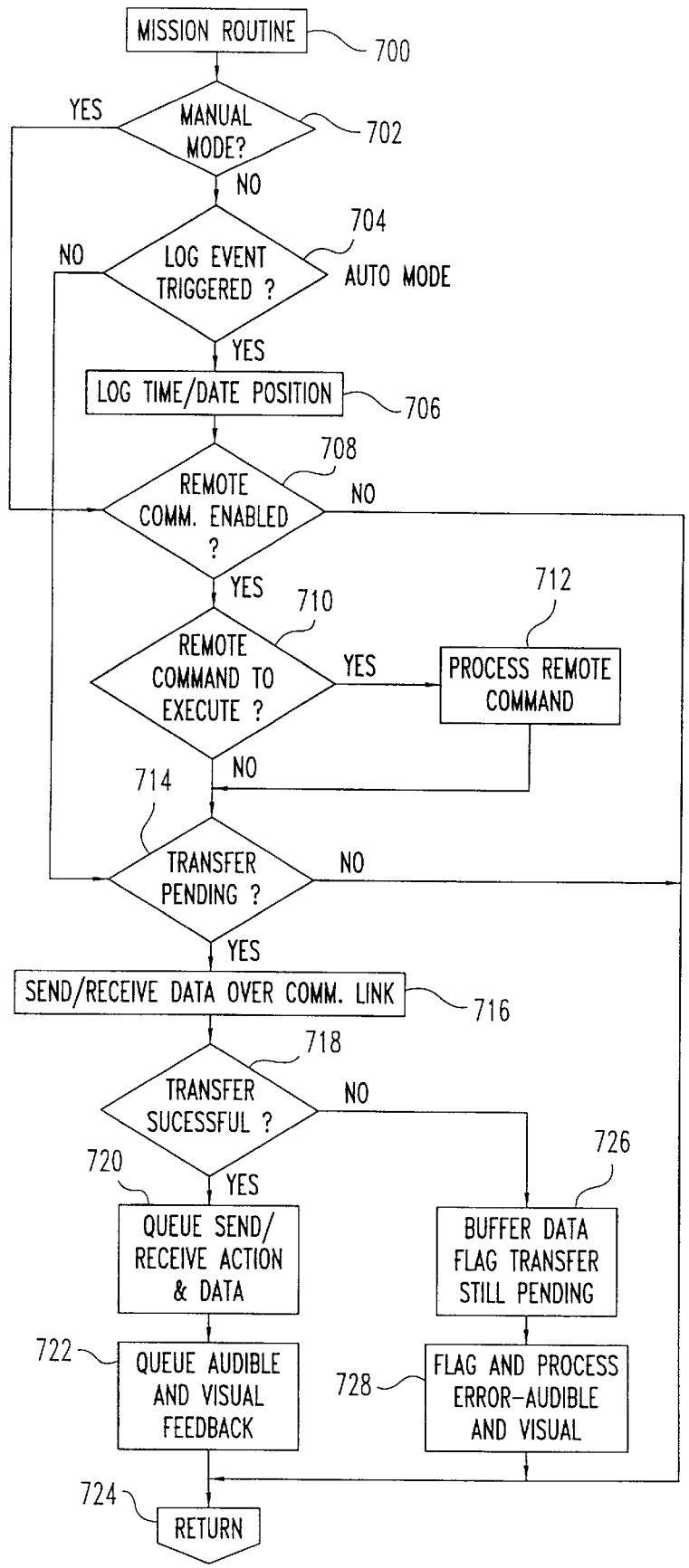
FIG. 9 is a flowchart illustrating a preferred embodiment of the mission subroutine called by the flowchart of FIG. 6.

Referring now to FIG. 9, the mission subroutine called at step 410 of FIG. 6 begins at step 700, and at step 702 processor 20 determines, in accordance with known techniques, whether it has been programmed for a manual mode of operation. If, at step 702, processor determines that it has been programmed for a manual mode of operation, then program execution advances to step 708. Otherwise, program execution advances to step 704 where an automatic mode of operation is assumed and processor 20 determines whether an event, as discussed hereinabove, has occurred to which processor 20 should be responsive to log a position and time-at-position of TLL 12 within memory 22. If, at step 704, processor 20 determines that a data logging event has not been triggered, then program execution advances to step 714. If, at step 704, processor determines that a log event has been triggered in an automatic operational mode, then program execution continues at step 706 where processor 20 records the position of TLL 12 and time at which the TLL 12 resides at the position within memory before continuing to step 708.

At step 708, processor 20 determines, via interrogation of radio transceiver 72, whether a remote communication has been enabled. If not, then program execution advances to step 724. If, however, processor 20 determines at step 708 that remote communication has been enabled through radio transceiver 72, program execution advances to step 710 where processor 20 tests radio transceiver 72 to determine whether there exists a remote command to execute. If so, then processor 20 executes the remote command and carries out the commanded function. As discussed in some detail hereinabove, examples of such remote commands may include, but are not limited to, reconfiguration of mission parameters and/or locations, record a "snapshot" of the current TLL 12 position and time-at-position, enter a "Bread Crumb" mode of operation to track the TLL 12 by periodically recording position and time-at-position information relating to the TLL 12, enter a manual mode of operation, enter an automatic mode of operation, send a message back to command center 90 such as ETA, job complete, current position, daily log or job parameter data, for example, input data from external reading device 114, output data to data output device 112, and the like. Other examples will become apparent to those skilled in the art.

Program execution advances from step 712, or from step 710 if processor 20 determines that there is no remote command to execute, to step 714 where processor 20 determines whether there is a transfer of communications pending between processor 20 and any external source via radio transceiver 72. If no such transfer is pending, program execution advances to step 724. If, however, processor 20 determines that a transfer of communications is pending at step 714, then program execution continues at step 716 where processor 20 is operable to send or receive data over the communications link established between radio transceiver 72 and radio transceiver 78. Thereafter at step 718, processor 20 determines, preferably via acknowledgment as is known in the art, whether the data transfer of step 716 was successful. If so, then processor 20 queues the send/receive data for action thereon at step 720 and thereafter queues audible and visual feedback information for display at step 722 before continuing at step 724. If, however, processor 20 determines that the data transfer of step 716 was unsuccessful, program execution advances to step 726 where processor 20 buffers the send/receive data and sets an internal flag indicating that the transfer is still pending. Thereafter at step 728, processor 20 flags and processes the data transfer error and preferably provides an audible and visual indication that the transfer was unsuccessful before advancing to step 724. At step 724, program execution is returned to step 410 of FIG. 6.

It should now be appreciated that the TLL 12 and system 10 embodiments described herein are operable to log times and locations of any entity (i.e. person, car, ship, etc.) either automatically (time or event based) or manually (event based) as it moves, preferably using the Global Positioning System. The TLL 12 preferably uses the GPS system's highly accurate time base and position information as the sensor means, and a microcomputer to store and retrieve data. When interfaced with another computer, the TLL 12 can be configured to operate in a predefined mode and can transfer collected time/location data to a database for inspection or for measurement of performance against preset goals. When interfaced to a communication device (i.e. cell phone or other means of transmitting information via wired or wireless communication), the TLL 12 can be queried periodically or on demand, or can transfer time and location data in real time to any device compatible with the transmitting media, such as telephone or radio. Further, when interfaced to a vehicle/engine control computer, the TLL 12 can collect time and location data relating to the vehicle in accordance with any desired vehicle/engine operating parameter criteria. Preferably, the TLL 12 is a battery powered, portable and compact hand-held unit that may further be configured for vehicle mounting.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A time and position logging device comprising:

a receiver for receiving radio signals transmitted from a plurality of earth orbiting satellites;

a processor for processing the radio signals and determining therefrom a position of said device in global coordinates and associated time information corresponding to a time at which said device resides at said position;

memory for storing a plurality of sets of said global coordinates and associated time information; and means responsive to a data capture command from an external source at a different geographical location from said device for logging the current values of said global coordinates and associated time information in said memory for later downloading to said external source.

2. The device of claim 1 wherein said position of said system in global coordinates includes latitudinal, longitudinal and altitudinal coordinates.

3. The device of claim 1 wherein said time information includes time-of-day and calendar date information.

4. The device of claim 1 further comprising a radio signal transceiver connected to said processor, said data capture command received by said radio signal transceiver and provided thereby to said processor.

5. The device of claim 4 wherein said external source includes a computer configured to transmit and receive data.

6. The device of claim 1 further comprising a data communications port connected to said processor, said data capture command received at said data communications port and provided thereby to said processor.

7. The device of claim 1 wherein the plurality of earth orbiting satellites form part of a GPS satellite configuration; and wherein the radio signals transmitted therefrom are GPS radio signals.

8. The device of claim 7 further including a transceiver for receiving radio signals transmitted from a differential GPS fixed position station, said processor further processing the radio signals received from said differential GPS position station and determining therefrom correction data for computing adjusted position information of said device, said adjusted position information more accurately reflecting a true position of said device.

9. A time and position logging device comprising:
a receiver for receiving radio signals transmitted from a plurality of earth orbiting satellites;
a switch actuatable to produce a first data capture signal;
means for receiving a second data capture signal provided by an external source;
a memory unit; and
a processor processing the radio signals and determining therefrom a position of said device in global coordinates and associated time information corresponding to a time at which said device resides at said position, said processor programmable to operate in:
a first mode of operation to store said position and associated time information within said memory unit in response to said first data capture signal; and
a second mode of operation to store said position and associated time information within said memory unit in response to said second data capture signal;
wherein said means for receiving a second data capture signal includes a radio signal transceiver connected to said processor, said second data capture signal received by said radio signal transceiver and provided thereby to said processor; and
wherein said external source includes a computer located remote from said device and including a radio signal transceiver.

10. The device of claim 9 further including a first software algorithm stored within said memory unit, said processor responsive to said first data capture signal to operate in said first mode of operation in accordance with said first software algorithm.

11. The device of claim 10 further including a second software algorithm stored within said memory unit, said processor responsive to said second data capture signal to operate in said second mode of operation in accordance with said second software algorithm.

12. The device of claim 9 wherein said means for receiving a second data capture signal further includes means for receiving an operational mode programming signal provided by said external source, said processor responsive to said operational mode programming signal to operate in one of said first and second operational modes in accordance therewith.

13. The device of claim 9 wherein the plurality of earth orbiting satellites form part of a GPS satellite configuration; and wherein the radio signals transmitted therefrom are GPS radio signals.

14. The device of claim 13 further including a second radio signal transceiver for receiving radio signals transmitted from a differential GPS fixed position station, said processor further processing the radio signals received from said differential GPS position station and determining therefrom correction data for computing adjusted position information of said device, said adjusted position information more accurately reflecting a true position of said device.

15. The device of claim 9 wherein said position of said device in global coordinates includes latitudinal and longitudinal coordinates.

16. The device of claim 15 wherein said position of said device in global coordinates further includes altitudinal coordinates.

17. The device of claim 15 wherein said time information includes time-of-day and calendar date information.

18. The device of claim 9 further including means for collecting a number of sets of said global coordinates and associated time information from said memory and compiling said number of sets for display.

19. The device of claim 9 wherein said switch forms part of a keypad operably connected to said processor.

20. In combination:
a computer configured to transmit and receive RF communication signals; and
a time and position logging device, said device comprising:
a receiver for receiving radio signals transmitted from a plurality of earth orbiting satellites;
a memory unit;
means for receiving the RF communication signals from the computer and programming said device in one of a manual operating mode and an automatic operating mode in accordance therewith; and
a processor processing the radio signals and determining therefrom a position of said device in global coordinates and associated time information corresponding to a time at which said device resides at said position, said processor operable in:
said manual operating mode to store said position and associated time information within said memory unit in response to a manual data capture signal; and
said automatic operating mode to store said position and associated time information within said memory unit in response to an automatic data capture signal.

21. The combination of claim 20 further including a switch manually actuatable to provide said manual data capture signal, wherein said receiver is a GPS receiver.

22. The combination of claim 21 wherein said switch forms part of a keypad operably connected to said processor.

23. The combination of claim 20 wherein said means for receiving the RF communication signals from the computer includes a radio signal transceiver connected to said processor, said RF communication signals received by said radio signal transceiver and provided thereby to said processor.

24. The combination of claim 20 wherein said position of said device in global coordinates includes latitudinal and longitudinal coordinates.

25. The combination of claim 24 wherein said position of said device in global coordinates further includes altitudinal coordinates.

26. The combination of claim 24 wherein said time information includes time-of-day and calendar date information.

27. The combination of claim 20 wherein the computer includes means for collecting a number of sets of said global coordinates and associated time information from said memory and compiling said number of sets for display.

28. The combination of claim 27 wherein the computer includes a monitor; and wherein the computer is operable to download said number of sets of said global coordinates and associated time information from said memory, process said sets in accordance with a report generating algorithm, and provide results thereof to said monitor for viewing.

29. The combination of claim 28 wherein the computer downloads said number of sets of said global coordinates and associated time information automatically in accordance with a predefined event.

30. A method of tracking position and time-at-position information of a person, the method comprising the steps of:

receiving radio signals transmitted from a plurality of earth orbiting satellites to a portable, battery-powered device carried by the person;

processing the radio signals and determining therefrom a position of the person in global coordinates and associated time information corresponding to a time at which the person resides at said position;

storing said position and time information in response to a data capture command signal from an external source at a different geographical location from said device; and providing said position and time information to a data reporting arrangement in response to a data reporting request from said external source.

31. The method of claim 30 further comprising the step of storing said position and time information in response to a manually activated data capture signal.

32. The method of claim 31 further comprising the step of storing said position and time information in response to the elapsing of a predetermined time period.

33. The method of claim 30 wherein said position of the person in global coordinates includes latitudinal and longitudinal coordinates.

34. The method of claim 33 wherein said position of the person in global coordinates further includes altitudinal coordinates.

35. The method of claim 33 wherein said time information includes time-of-day and calendar date information.

36. The method of claim 30 further including the steps of:

receiving radio signals transmitted by a differential fixed-position station;

processing the radio signals transmitted by the differential fixed-position station and determining therefrom position and time information correctional data; and adjusting the position and time information in accordance with the position and time information correctional data.

37. The method of claim 30 wherein the plurality of earth orbiting satellites form part of a GPS satellite configuration; and wherein the radio signals transmitted therefrom are GPS radio signals.

38. A personal tracking device comprising:

a lightweight housing adapted to be carried by a person;

a GPS receiver contained in said housing;

a memory unit contained in said housing;

a processor contained in said housing for processing radio signals received by said GPS receiver and determining therefrom the person's position in global coordinates;

means responsive to a data capture command signal from an external source for storing said position in said memory unit; and means for transmitting said position to said external source in response to a second command signal from said external source.

39. The device of claim 38 further comprising switch means for generating a manual data capture signal, and means responsive to said manual data capture signal for storing said position in said memory unit.

40. The device of claim 39 further comprising an automatic operating mode algorithm stored in said memory unit, and means responsive to said algorithm for storing position information in said memory unit automatically when said automatic operating mode is enabled, whereby said tracking device is capable of selectively storing position information in response to any one of said data capture command signal, said manual data capture signal, and automatically in accordance with said automatic operating mode algorithm.

41. The device of claim 40 wherein said processor further includes means responsive to radio signals from a differential GPS fixed-position station for adjusting position information.

42. The device of claim 41 wherein said processor further includes means for determining from said radio signals received by said GPS receiver the time at position for the person being tracked.

* * * * *